US011776252B2

United States Patent
Das et al.

(10) Patent No.: US 11,776,252 B2
(45) Date of Patent: Oct. 3, 2023

(54) METHOD AND SYSTEM FOR ASSET INSPECTION USING UNMANNED AERIAL VEHICLES

(71) Applicant: Tata Consultancy Services Limited, Mumbai (IN)

(72) Inventors: Apurba Das, Bangalore (IN); Anu Shrivastava, Bangalore (IN); Kajol Zade, Bangalore (IN); Yedakula Lakshmi Narasimha Sunny, Bangalore (IN); Pallavi Saha, Bangalore (IN); Thanga Jawahar, Bangalore (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 288 days.

(21) Appl. No.: 17/395,280

(22) Filed: Aug. 5, 2021

(65) Prior Publication Data

US 2022/0083774 A1 Mar. 17, 2022

(30) Foreign Application Priority Data

Sep. 14, 2020 (IN) .............................. 202021039778

(51) Int. Cl.
*G06V 20/10* (2022.01)
*G06T 7/50* (2017.01)
(Continued)

(52) U.S. Cl.
CPC ............ *G06V 20/10* (2022.01); *B64C 39/024* (2013.01); *G06F 18/21* (2023.01); *G06F 18/214* (2023.01);
(Continued)

(58) Field of Classification Search
CPC ...... G06V 20/10; G06V 10/40; G06V 10/751; G06V 10/77; G06V 10/774; G06V 10/82;
(Continued)

(56) References Cited

U.S. PATENT DOCUMENTS 9,589,193 B2 * 3/2017 Fukata ..................... H04N 7/18
9,740,943 B2 * 8/2017 Hayakawa ............. G08G 1/166
(Continued)

OTHER PUBLICATIONS

Doria, David et al., "Filling Large Holes in LiDAR Data by Inpainting Depth Gradients", Computer Science, 2012, IEEE, http://www.ecse.rpi.edu/~riradke/papers/doria-iwpcp12.pdf.

*Primary Examiner* — Aaron W Carter
(74) *Attorney, Agent, or Firm* — FINNEGAN, HENDERSON, FARABOW, GARRETT & DUNNER LLP

(57) ABSTRACT

This disclosure generally relates to method and system for asset inspection using unmanned aerial vehicles. Regular inspection of assets in any environment is time consuming and involves physical risk and injury to the property. The method includes receiving a plurality of input images of an asset using unmanned aerial vehicle and generates a 3D point cloud based on overlapped images identified from the plurality of input images of the asset being inspected. Further, anomalies are detected and defects are observed in the one or more objects of interests based on the change observed in each 2D image frame from the plurality 2D image frames in a specific view with an identical objects of interest of the 2D image frame. A pyramidal view map is created for the plurality 2D image frames by mapping each pixel of the plurality 2D image frames with the plurality of input images.

15 Claims, 4 Drawing Sheets

(51) Int. Cl.
*G06V 10/40* (2022.01)
*G06V 10/75* (2022.01)
*B64C 39/02* (2023.01)
*G06N 3/04* (2023.01)
*G06T 11/00* (2006.01)
*G06T 15/00* (2011.01)
*G06F 18/21* (2023.01)
*G06F 18/214* (2023.01)
*G06V 10/77* (2022.01)
*G06V 10/774* (2022.01)
*G06V 10/82* (2022.01)
*B64U 101/30* (2023.01)

(52) U.S. Cl.
CPC ............. *G06N 3/04* (2013.01); *G06T 7/50* (2017.01); *G06T 11/00* (2013.01); *G06T 15/00* (2013.01); *G06V 10/40* (2022.01); *G06V 10/751* (2022.01); *G06V 10/77* (2022.01); *G06V 10/774* (2022.01); *G06V 10/82* (2022.01); *B64U 2101/30* (2023.01); *G06T 2207/20081* (2013.01); *G06T 2207/20084* (2013.01)

(58) Field of Classification Search
CPC ..... B64C 39/024; G06F 18/21; G06F 18/214; G06N 3/04; G06T 7/50; G06T 11/00; G06T 15/00; G06T 2207/20081; G06T 2207/20084; G06T 2207/10016; G06T 2207/10032; G06T 2207/20016; G06T 2207/20076; G06T 7/0004; B64U 2101/30
See application file for complete search history.

(56) References Cited

U.S. PATENT DOCUMENTS

| | | | |
|---|---|---|---|
| 9,776,566 B2 * | 10/2017 | Ishimoto | E02F 9/262 |
| 9,862,320 B2 * | 1/2018 | Hayakawa | B60S 1/46 |
| 10,313,575 B1 * | 6/2019 | Wingo | H04N 23/62 |
| 10,521,960 B2 * | 12/2019 | Gray | G05D 1/0094 |
| 10,607,406 B2 * | 3/2020 | Sen | G06T 17/05 |
| 10,633,093 B2 * | 4/2020 | Castillo-Effen | G06T 19/006 |
| 10,679,338 B2 * | 6/2020 | Gros | G06T 7/40 |
| 10,690,525 B2 * | 6/2020 | Zhao | G01C 23/00 |
| 11,023,730 B1 * | 6/2021 | Zhou | G06N 3/08 |
| 11,200,146 B2 * | 12/2021 | Darke | G06F 11/3664 |
| 11,354,856 B2 * | 6/2022 | Song | G01C 21/3804 |
| 11,386,541 B2 * | 7/2022 | Al Shehri | G06N 3/044 |
| 11,392,897 B1 * | 7/2022 | Gingrich | G06T 7/55 |
| 11,403,742 B2 * | 8/2022 | Fukasawa | G06T 3/4038 |
| 11,508,056 B2 * | 11/2022 | White | G05D 1/0094 |
| 11,527,084 B2 * | 12/2022 | Taghavi | G06V 20/647 |
| 11,584,525 B2 * | 2/2023 | Alrasheed | G05D 1/12 |
| 2010/0036242 A1 * | 2/2010 | Yuk | G01S 7/52082 600/437 |
| 2012/0140060 A1 * | 6/2012 | Tsuchiya | G01N 21/95607 348/126 |
| 2019/0066283 A1 * | 2/2019 | Gros | G06T 7/40 |
| 2019/0066317 A1 * | 2/2019 | Chang | G05D 1/0094 |
| 2019/0368133 A1 * | 12/2019 | Joshi | G06T 7/11 |
| 2021/0315546 A1 * | 10/2021 | Aarts | G16H 40/40 |
| 2022/0083774 A1 * | 3/2022 | Das | G06V 10/40 |
| 2022/0084278 A1 * | 3/2022 | Das | G06T 15/40 |
| 2022/0309708 A1 * | 9/2022 | Bhate | G06T 7/20 |

* cited by examiner

METHOD AND SYSTEM FOR ASSET INSPECTION USING UNMANNED AERIAL VEHICLES

PRIORITY CLAIM

This U.S. Patent application claims priority under 35 U.S.C § 119 to Indian patent application no. (202021039778), filed on Sep. 14, 2020. The entire contents of the aforementioned application are incorporated herein by reference

TECHNICAL FIELD

The disclosure herein generally relates to asset inspection, and, more particularly, to method and system for asset inspection using unmanned aerial vehicles.

BACKGROUND

Inspecting monitoring environments such as manufacturing unit having assets such as chimney, pipelines and thereof consume significant time and human effort. Regular inspection of these assets involve physical climbing onto roofs may incur significant risks, personal injuries and damages to the property itself. In such scenario, monitoring environments needs to be dynamically inspected to detect damage of assets and document those identified defects for reducing equipment failures to be occurred by rights-of-way, theft, vandalism, and terrorism threats to ensure safe operating conditions and to plan and prioritize scheduled or emergency maintenance. Additionally, real-time identification of asset type, asset identifier (ID), defect type, and defect severity is an important task in any asset monitoring environment.

SUMMARY

Embodiments of the present disclosure present technological improvements as solutions to one or more of the above-mentioned technical problems recognized by the inventors in conventional systems. For example, in one embodiment, a system for asset inspection using unmanned aerial vehicles is provided. The system includes deploying, an unmanned aerial vehicle to inspect one or more assets associated with an asset monitoring environment, wherein the unmanned aerial vehicle is configured to flew on a predetermined height above the one or more assets being inspected within the asset monitoring environment. Further, a plurality of input images of an asset from the one or more assets are received using an image capturing device positioned with the unmanned aerial vehicle. The plurality of input images provides structural health of the asset from the one or more assets being inspected. Then, a 3D point cloud generator generates a 3D point cloud based on the overlapped images identified from the plurality of input images of the asset being inspected. The 3D point cloud is converted into a plurality of 2D image frames based on the angle of projection from the top view of the asset being inspected. Further, a bird's eye view of the asset based on the plurality 2D image frames is generated, wherein the empty patches of each 2D image frame from the plurality 2D image frames are filled based on range-domain filtering. The one or more objects of interests from the plurality 2D image frames are detected using a mask convolutional network (RCNN). The anomalies present in the one or more objects of interests associated with the plurality 2D image frames are detected using an anomaly detection technique, wherein the anomalies are detected based on a training data serving as ground truth associated with the trained convolutional autoencoder, wherein the training data are samples of the one or more objects of interest for determining deviation observed. Further, using a change detection technique, the defects observed with the one or more objects of interests based on the change observed in each 2D image frame from the plurality 2D image frames in a specific view with an identical objects of interest of the 2D image frame representing the same asset based on varying time stamps and a EXIF data based closest possible pairing.

In another embodiment, the anomalies observed in the objects of interest associated with the plurality 2D image frames includes extracting, by a trained convolutional autoencoder, a plurality of features of the one or more objects of interest present in each 2D image frame to detect anomalies. Further, the plurality of features of the one or more objects of interest present in each 2D image frame are matched with the training dataset based on a preconfigured threshold. Further, the anomalies present in the one or more objects of interest observed in each 2D image frame are observed based on the maximum matching difference obtained with the one or more objects of interest present in each 2D image frame with the training dataset.

In another aspect, a method for asset inspection using unmanned aerial vehicles is provided. The method includes deploying, an unmanned aerial vehicle to inspect one or more assets associated with an asset monitoring environment, wherein the unmanned aerial vehicle is configured to flew on a predetermined height above the one or more assets being inspected within the asset monitoring environment. Further, a plurality of input images of an asset from the one or more assets are received using an image capturing device positioned with the unmanned aerial vehicle. The plurality of input images provides structural health of the asset from the one or more assets being inspected. Then, a 3D point cloud generator generates a 3D point cloud based on the overlapped images identified from the plurality of input images of the asset being inspected. The 3D point cloud is converted into a plurality of 2D image frames based on the angle of projection from the top view of the asset being inspected. Further, a bird's eye view of the asset based on the plurality 2D image frames is generated, wherein the empty patches of each 2D image frame from the plurality 2D image frames are filled based on range-domain filtering. The one or more objects of interests from the plurality 2D image frames are detected using a mask convolutional network (RCNN). The anomalies present in the one or more objects of interests associated with the plurality 2D image frames are detected using an anomaly detection technique, wherein the anomalies are detected based on a training data serving as ground truth associated with the trained convolutional autoencoder, wherein the training data are samples of the one or more objects of interest for determining deviation observed. Further, using a change detection technique, the defects observed with the one or more objects of interests based on the change observed in each 2D image frame from the plurality 2D image frames in a specific view with an identical objects of interest of the 2D image frame representing the same asset based on varying time stamps and a EXIF data based closest possible pairing.

In another embodiment, the anomalies observed in the objects of interest associated with the plurality 2D image frames includes extracting, by a trained convolutional autoencoder, a plurality of features of the one or more objects of interest present in each 2D image frame to detect anomalies.

Further, the plurality of features of the one or more objects of interest present in each 2D image frame are matched with the training dataset based on a preconfigured threshold. Further, the anomalies present in the one or more objects of interest observed in each 2D image frame are observed based on the maximum matching difference obtained with the one or more objects of interest present in each 2D image frame with the training dataset.

In yet another aspect, provides one or more non-transitory machine readable information storage mediums comprising one or more instructions, which when executed by one or more hardware processors perform actions includes deploying, an unmanned aerial vehicle to inspect one or more assets associated with an asset monitoring environment, wherein the unmanned aerial vehicle is configured to flew on a predetermined height above the one or more assets being inspected within the asset monitoring environment. Further, a plurality of input images of an asset from the one or more assets are received using an image capturing device positioned with the unmanned aerial vehicle. The plurality of input images provides structural health of the asset from the one or more assets being inspected. Then, a 3D point cloud generator generates a 3D point cloud based on the overlapped images identified from the plurality of input images of the asset being inspected. The 3D point cloud is converted into a plurality of 2D image frames based on the angle of projection from the top view of the asset being inspected. Further, a bird's eye view of the asset based on the plurality 2D image frames is generated, wherein the empty patches of each 2D image frame from the plurality 2D image frames are filled based on range-domain filtering. The one or more objects of interests from the plurality 2D image frames are detected using a mask convolutional network (RCNN). The anomalies present in the one or more objects of interests associated with the plurality 2D image frames are detected using an anomaly detection technique, wherein the anomalies are detected based on a training data serving as ground truth associated with the trained convolutional autoencoder, wherein the training data are samples of the one or more objects of interest for determining deviation observed. Further, using a change detection technique, the defects observed with the one or more objects of interests based on the change observed in each 2D image frame from the plurality 2D image frames in a specific view with an identical objects of interest of the 2D image frame representing the same asset based on varying time stamps and a EXIF data based closest possible pairing.

In another embodiment, the anomalies observed in the objects of interest associated with the plurality 2D image frames includes extracting, by a trained convolutional autoencoder, a plurality of features of the one or more objects of interest present in each 2D image frame to detect anomalies. Further, the plurality of features of the one or more objects of interest present in each 2D image frame are matched with the training dataset based on a preconfigured threshold. Further, the anomalies present in the one or more objects of interest observed in each 2D image frame are observed based on the maximum matching difference obtained with the one or more objects of interest present in each 2D image frame with the training dataset.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
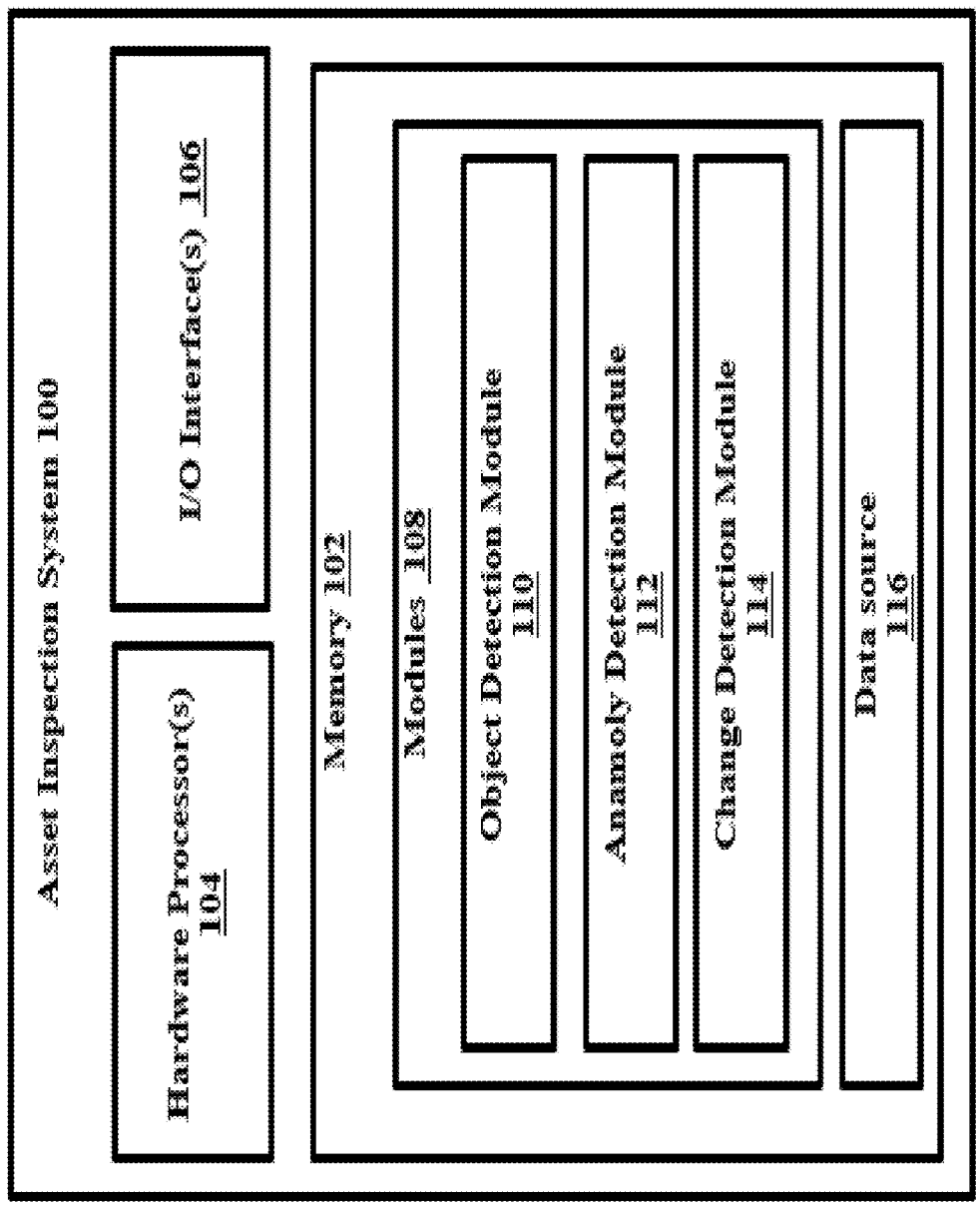
FIG. 1 illustrates an exemplary block diagram of a system (alternatively referred as an asset inspection system), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and system for asset inspection using unmanned aerial vehicles. The system may be alternatively referred as asset inspection system, which enables detection of anomalies present on one or more assets being monitored by unmanned aerial vehicles. Examples of the asset monitoring environment include manufacturing units, industries, buildings and thereof are deployed with the unmanned aerial vehicles, wherein the unmanned aerial vehicles are configured to fly on a predetermined height above the one or more assets being inspected within the asset monitoring environment. The unmanned aerial vehicles capture the input images of the asset being inspected and processes these input images to detect anomalies and change(s) occurring/occurred. The detected anomalies are observed on the object of interests associated with the input image frames by converting into a plurality of 2D image frames. Additionally, the change detection technique detects defects observed with one or more objects of interest based on the change observed in each 2D image frame from the plurality of 2D image frames.

Referring now to the drawings, and more particularly to FIG. 1 through FIG. 3B, where similar reference characters denote corresponding features consistently throughout the figures, there are shown preferred embodiments and these embodiments are described in the context of the following exemplary system and/or method.

FIG. 1 illustrates an exemplary block diagram of a system (alternatively referred as an asset inspection system), in accordance with some embodiments of the present disclosure. In an embodiment, the asset inspection system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, 10 hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 comprises a plurality of modules 108 such as an object detection module 110, an anomaly detection module 112, and a change detection module and so on, to implement the functions for detecting anomalies present on the one or more object of interests associated with the asset being monitored by the unmanned aerial vehicles using the asset inspection system 100.

Figure 2:
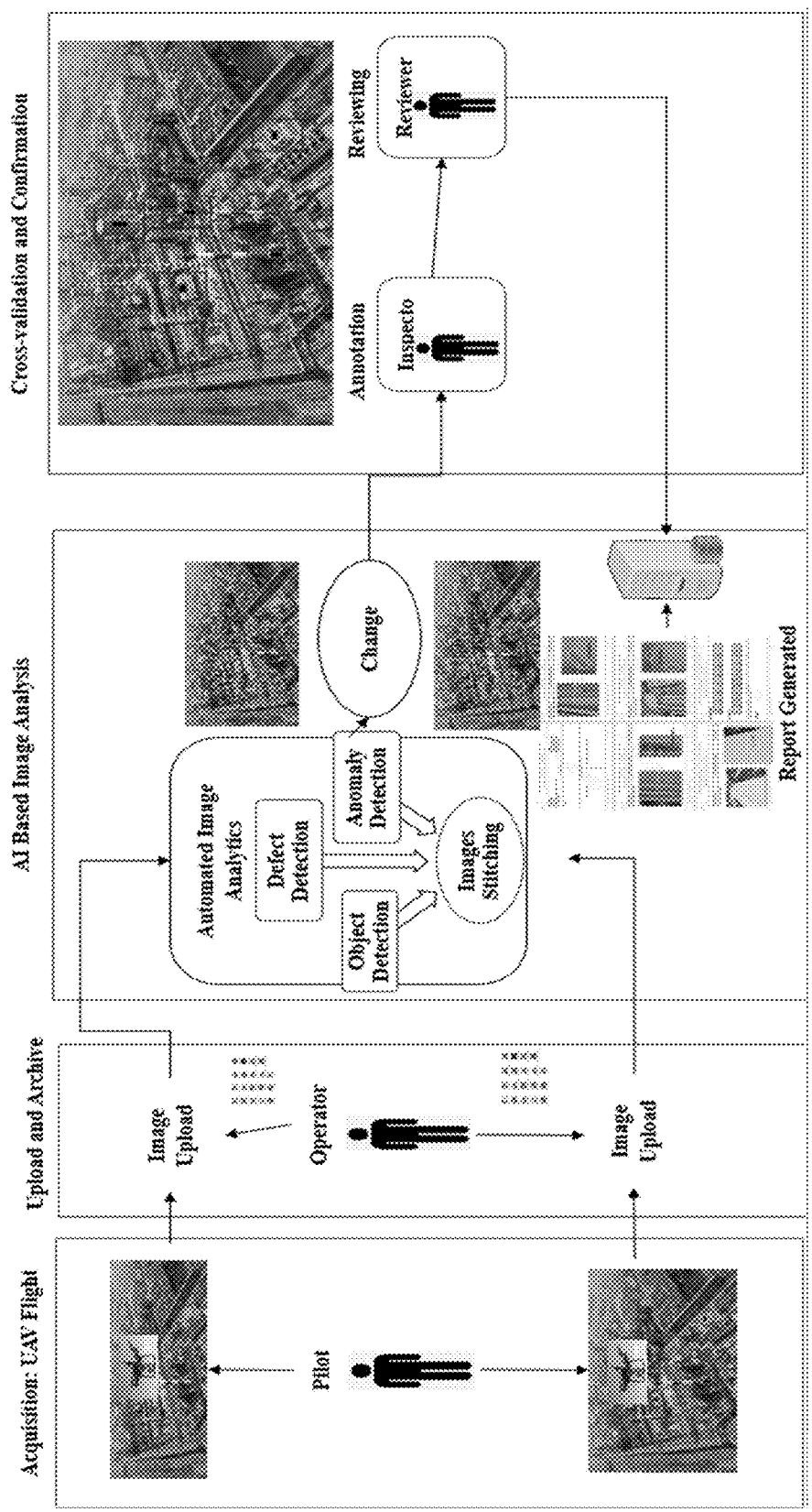
FIG. 2 illustrates a high-level architectural overview of the monitoring environment for inspecting structural health of assets using an unmanned aerial vehicle, in accordance with some embodiments of the present disclosure.

FIG. 2 illustrates a high-level architectural overview of the monitoring environment for inspecting structural health of assets using an unmanned aerial vehicle, in accordance with some embodiments of the present disclosure. FIG. 2 is an example monitoring environment comprising one or more assets to be monitored using the unmanned aerial vehicles. The system 100 receives a plurality of input images of the one or more assets using a image capturing device positioned with the unmanned aerial vehicles. Each input image from the plurality of input image frames provides structural health of the asset. The object detection module 110 detects one or more object of interests associated with each input image frame. The anomaly detection module 112 detects anomalies present on the one or more object of interests based on a training data which serves as ground truth for determining deviations. The anomaly detection module 112 is a pretrained convolutional autoencoder comprising the training data. The change detection module 114 detects defects observed with the one or more object of interests by varying time stamps and EXIF data based closest possible pair. The pre-trained convolutional autoencoder comprises training data as clean image samples to establish pattern statistics automatically. The anomaly detection module 112 detects anomalies based on the pattern and creates deviation from null hypothesis. The identified unseen class of defects are localized without the system being trained with the specific defect type.

Further, the memory 102 may comprise information pertaining to input(s)/output(s) of each step performed by the processor(s) 104 of the system 100 and methods of the present disclosure. Functions of the components of system 100, for inspecting asset using the unmanned aerial vehicle, are explained in conjunction with FIG. 3A and FIG. 3B providing flow diagram, architectural overviews, and performance analysis of the system 100.

Figure 3A:
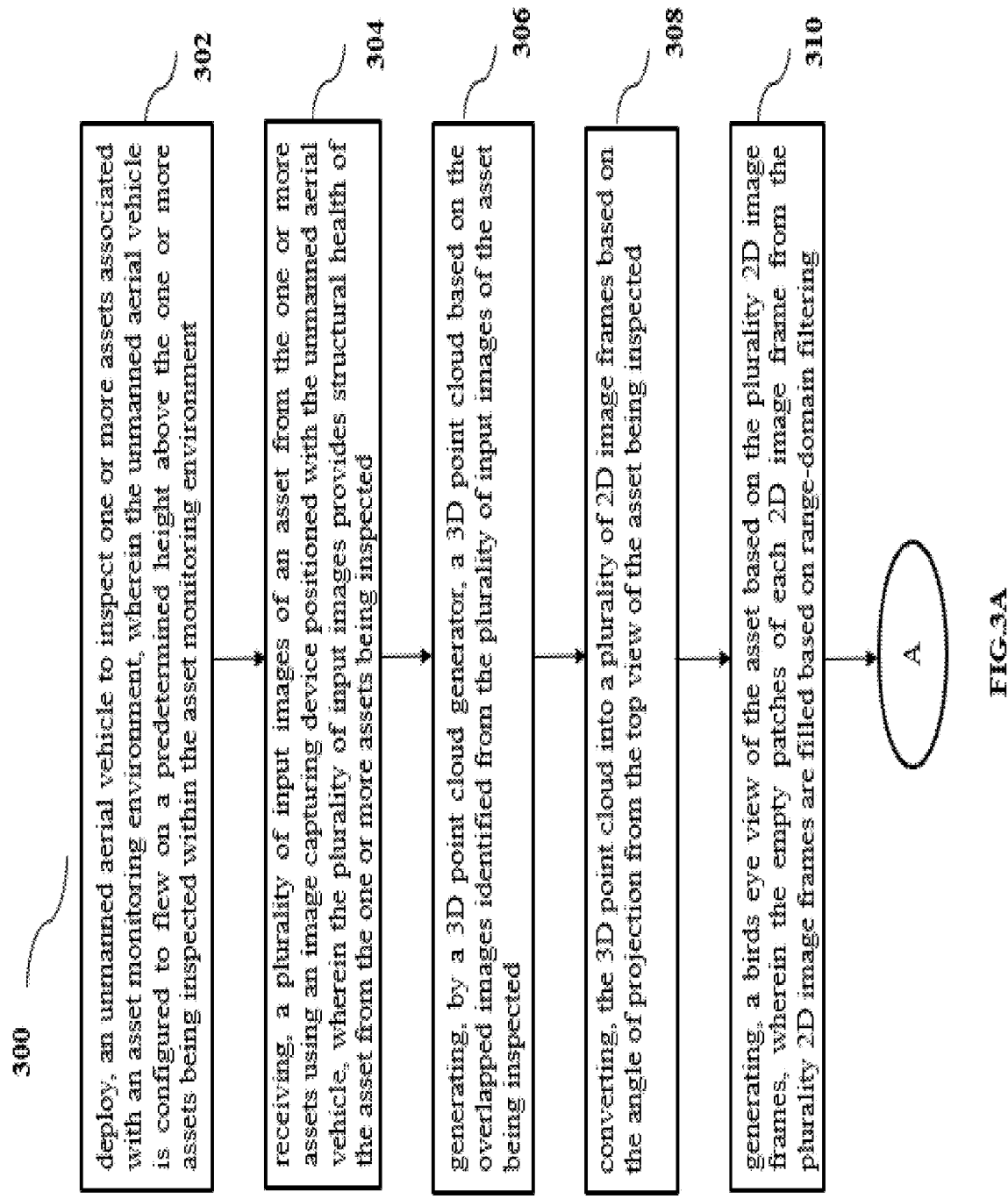
FIGS. 3A and 3B is a flow diagram illustrating a method for inspecting assets using the unmanned aerial vehicles using the system of FIG. 1, in accordance with some embodiments of the present disclosure.
Figure 3B:
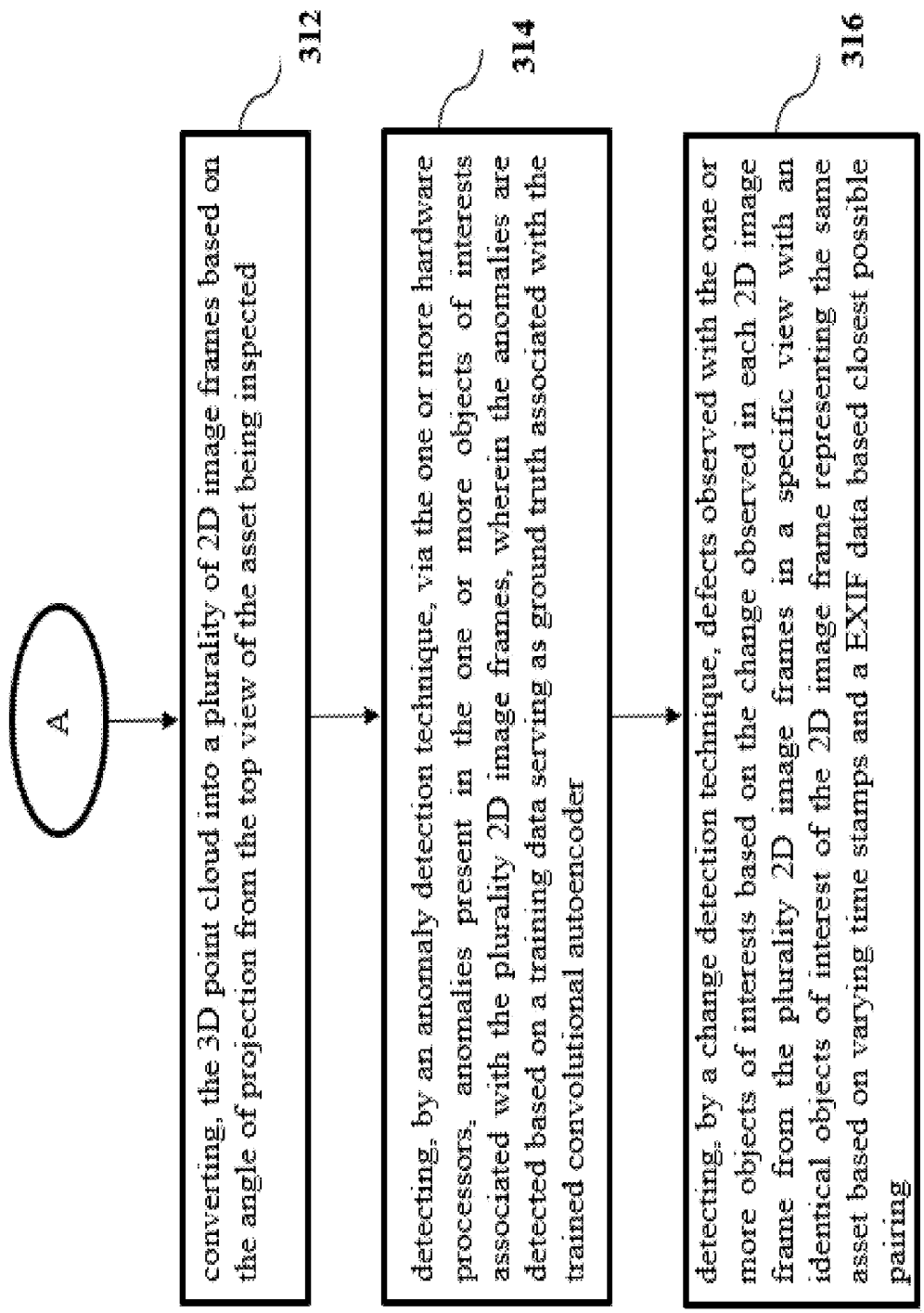

FIG. 3A through 3B is flow diagrams illustrating a method for inspecting assets using the unmanned aerial vehicles using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and the steps of flow diagram as depicted in FIGS. 3A & 3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 deploy an unmanned aerial vehicle to inspect one or more assets associated with an asset monitoring environment, wherein the unmanned aerial vehicle is configured to fly on a predetermined height above the one or more assets being inspected within the asset monitoring environment. The autonomous flight of the unmanned aerial vehicle creates a flight plan and transmits to the unmanned aerial vehicle from a cloud system or a user device. The flight plan instructs the unmanned aerial vehicle with regard to the autonomous flight along a particular flight path in three-dimensional (3D) space. The flight plan includes a series of connected waypoints that define where the unmanned aerial vehicle should fly and what actions the unmanned aerial vehicle should take during a flight. The unmanned aerial vehicle may have an autopilot flight module operating on the unmanned aerial vehicle computer system that uses the flight plan to automatically pilot the unmanned aerial vehicle.

Referring now to the steps of the method 300, at step 304, the one or more hardware processors 104 receive a plurality of input images of an asset from the one or more assets using the image capturing device positioned with the unmanned aerial vehicle, wherein the plurality of input images provides structural health of the asset from the one or more assets being inspected. For example, the asset monitoring environment comprises a rooftop, chimneys, pipelines and a gas holder but not limited to any assets profound. The unmanned aerial vehicle takes the flight plan contingencies created using the cloud system or a user device. The flight plan contingency instructs the unmanned aerial vehicles to perform an action to fly above the assets associated with the monitoring environment thereby capturing the plurality of input image frames.

Referring now to the steps of the method 300, at step 306, the one or more hardware processors 104 generate, via a 3D point cloud generator, a 3D point cloud based on the overlapped images identified from the plurality of input images of asset being inspected. Here, the plurality of input images of the rooftop, the chimneys, the pipelines and the gas holder are captured using the unmanned aerial vehicles which are considered as one or more object of interests in overlapped with a predefined percentage value such as 60-80% from all the views of the monitoring environment. Further, the 3D point cloud for the plurality of input image frames serve as input to the 3D reconstruction algorithm associated with the 3D point cloud generator generated based on the overlapped images. This 3D reconstruction algorithm extracts features of the plurality of input image frames by performing feature mapping. One or more surface reconstruction algorithms are applied on the features of the plurality of input images to generate the 3D point cloud. The ground points of the 3D point cloud are marked, and the segmented ground points perform color space segmentation on the 3D point cloud. Further, the 3D point cloud is enabled to obtain each input image to rotate in all directions where the ground points are at maximum apart to calculate distance measurement. Here, distinguishable markers are added on the one or more object of interests where distances between the markers are known with the shape as square. The unmanned aerial vehicles captured images reconstructs the 3D point cloud and auto-rotates the 3D point cloud to obtain exact square view ensuring 90-degree line of view of the markers Referring now to the steps of the method 300, at step 308, the one or more hardware processors 104 convert the 3D point cloud into a plurality of 2D image frames based on the angle of projection from the top view of the asset being inspected. A distance map is created from the above generated 3D point cloud using a fixed reference point. Further, a 3D grid is generated for the given output image size using the distance map and intensity values of the corresponding points of the 3D point cloud. Further, the angle of projections is calculated dynamically by determining the flight pattern using GPS metadata such as latitude, longitude, and altitude.

Referring now to the steps of the method 300, at step 310, the one or more hardware processors 104 generate a birds eye view of the asset based on the plurality 2D image frames, wherein one or more empty patches of each 2D image frame from the plurality 2D image frames are filled based on range-domain filtering. The redundant part of each 2D image frame is cropped by detecting the biggest closed contour. The empty patches filled with range-domain filtering prevents the asset edges and outer boundary of each 2D image frame from the plurality of 2D image frames using the dynamic kernels.

Referring now to the steps of the method 300, at step 312, the one or more hardware processors 104 detect one or more object of interests from the plurality 2D image frames using a mask convolutional network (RCNN). Further, from the plurality of 2D image frames one or more object of interests are detected using a single shot detector (SSD) mobile net deep neural network. The object detection module 110 of the system 100 detects one or more object of interests present in each 2D image frame from the plurality of 2D image frames. The single shot detector (SSD) mobile net deep neural network detects one or more object of interests at faster rate. The one or more object of interests are marked and fed to the single shot detector (SSD) mobile net deep neural network which learns the features to predict real-time/real-world scenarios. The trained convolutional network (RCNN) model with images marked with objects is defects. The masked convolutional network (RCNN) is an instance segmentation to localize the defects for different objects and the model is trained to identify defects corresponding the object.

Referring now to the steps of the method 300, at step 314, the one or more hardware processors 104 detect, via an anomaly detection technique, anomalies present in the one or more objects of interests associated with the plurality 2D image frames. The anomalies are detected based on a training data serving as ground truth associated with the trained convolutional autoencoder. The training data comprises samples of the one or more objects of interest for determining deviation observed. Based on the one or more object of interests detected, the anomaly detection module 112 of the system 100 detects anomalies such as foreign objects which includes ropes, wires and thereof are detected as unseen and unknown definition. The unknown objects are considered as anomalies present on the one or more object of interests. The anomaly detection technique extracts a plurality of features of the one or more objects of interest present in each 2D image frame to detect anomalies are extracted by the trained convolutional autoencoder and further tries to regenerate the same 2D image in the encoder block based on the encoded features. The plurality of features of the one or more objects of interest present in each 2D image frame are matched with the training dataset. The convolutional autoencoder has several clean one or more object of interests and is capable of generating clean images even if anomalies detected 2D image frame are fed to the autoencoder. The anomalies present in the one or more objects of interest observed in each 2D image frame are detected based on the maximum matching difference obtained with the one or more objects of interest present in each 2D image frame with the training dataset. The anomalies are null hypothesis of the pattern statistics with the clean objects. Here, difference between the 2D image frame with the anomalies present and the regenerated clean object image is computed based on pixel wise tolerance. A clustering algorithm is implemented by the system 100 of the present disclosure, wherein the clustering algorithm groups the nearby highlighted points and localizes it as one object of interest.

Referring now to the steps of the method 300, at step 316, the one or more hardware processors 104 detect, via a change detection technique, one or more defects observed with the one or more objects of interests based on the change observed in each 2D image frame from the plurality 2D image frames in a specific view with an identical objects of interest of the 2D image frame representing the same asset based on varying time stamps and a EXIF data based closest possible pairing. The geographical distance of the 2D image frames is calculated in a specific view with the identical objects of interest of the 2D image frame representing the same asset in varying time stamps. Further, the EXIF data is identified based on closest possible pairing based on the calculated geographical distance.

In one embodiment, based on the EXIF data available in each of the captured input images. This EXIF data provides different geographic locations data which helps to locate neighbouring input images in different sessions. The EXIF data includes latitude, longitude, altitude of drone position, camera pan/tilt/yaw and therefore to find closest matched image pairs between the sessions of flight for any arbitrary target asset. Further, a correspondence has been established through the aforementioned method and defect magnitude is compared.

In one embodiment, the method further comprises creating a pyramidal view map for the plurality 2D image frames by mapping each pixel of the plurality 2D image frames with the plurality of input images using a key point matching technique. The key point matching technique extracts a feature set of the plurality of input images of the asset being inspected and compares with each member (or candidate)

image associated with the 3D point cloud. Here, each image of the 3D point cloud is referred as member image. The pyramidal view map of each pixel maps to the plurality 2D image frames. Perspective mapping and dynamic geometric transformation is used based on oriented fast and rotated brief (ORB) features Further, a 3D holistic surface is created by stitching the plurality 2D image frames based on (i) the overlapped images identified from the plurality of input images, and (ii) a pseudo motion observed in the asset being inspected. Further, a zero-degree rotation is performed on the z-axis of the 3D holistic surface which flattens the plurality 2D image frames representing the 3D holistic surface. Further, automated scale-based visualization is performed on different regions of the 3D holistic surface. The closest member image associated with the 3D point cloud is fetched based on maximum features matching with the plurality 2D image frames. Further rotation and affine scaling are performed to fit the degree of convergence for the maximum matched features by calculating a homography matrix. Then, a blank image is created for each member image associated with the 3D point cloud which fits gaussian pdf on the region of matching features to merge the black image for creating pixel level mapping.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of asset inspection. The embodiment thus provides method and system for asset inspection using unmanned aerial vehicles. Moreover, the embodiments herein further provide inspection of assets by performing aerial image analysis. The method enables detecting anomalies present in the one or more objects of interests associated with the plurality 2D image frames. The unmanned aerial vehicle inspects one or more assets associated with an asset monitoring environment. The unmanned aerial vehicle is configured to flew on a predetermined height above the one or more assets being inspected within the asset monitoring environment Also, the method detects defects observed with the one or more objects of interests based on the change observed in each 2D image frame from the plurality 2D image frames in a specific view with an identical objects of interest of the 2D image frame representing the same asset based on varying time stamps and a EXIF data based closest possible pairing. Further, the method creates a 3D holistic surface by stitching the plurality 2D image frames based on the overlapped images identified from the plurality of input images, and a pseudo motion observed in the asset being inspected. The method also performs rotation and affine scaling to fit the degree of convergence for the maximum matched features by calculating a homography matrix.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor (104) implemented method for inspecting asset using an unmanned aerial vehicle, the method comprising:

deploying (302), via one or more hardware processors (104), an unmanned aerial vehicle to inspect one or more assets associated with an asset monitoring environment, wherein the unmanned aerial vehicle is configured to fly at a predetermined height above the one or more assets being inspected within the asset monitoring environment;

receiving (304), via the one or more hardware processors (104), a plurality of input images of an asset from the one or more assets using an image capturing device positioned with the unmanned aerial vehicle, wherein the plurality of input images provides structural health of the asset from the one or more assets being inspected;

generating (306), via the one or more hardware processors (104), by a three-dimensional (3D) point cloud generator, a 3D point cloud based on one or more overlapped images identified from the plurality of input images of the asset being inspected;

converting (308), via the one or more hardware processors (104), the 3D point cloud into a plurality of 2D image frames based on an angle of projection from a top view of the asset being inspected;

generating (310), via the one or more hardware processors (104), a birds eye view of the asset based on the plurality 2D image frames, wherein one or more empty patches of each 2D image frame from the plurality 2D image frames are filled based on range-domain filtering;

detecting (312), via the one or more hardware processors (104), one or more objects of interests from the plurality 2D image frames using a mask convolutional network (RCNN);

detecting (314), by an anomaly detection technique executed by the one or more hardware processors (104), one or more anomalies present in the one or more objects of interests associated with the plurality 2D image frames, wherein the one or more anomalies are detected based on a training data serving as ground truth associated with a trained convolutional autoencoder, and wherein the training data comprises one or more samples of the one or more objects of interest for determining deviation observed; and detecting (316), by a change detection technique executed by the one or more hardware processors (104), one or more defects observed in the one or more objects of interests based on the change observed in each 2D image frame from the plurality 2D image frames in a specific view with an identical objects of interest of the 2D image frame representing the asset based on varying time stamps and an EXIF data based closest possible pairing.

2. The method as claimed in claim 1, wherein detecting the one or more anomalies observed in the objects of interest associated with the plurality 2D image frames comprises:

extracting, by the trained convolutional autoencoder, a plurality of features of the one or more objects of interest present in each 2D image frame to detect anomalies;

matching, based on a preconfigured threshold, the plurality of features of the one or more objects of interest present in each 2D image frame with the training dataset comprised in a memory; and detecting, the one or more anomalies present in the one or more objects of interest observed in each 2D image frame based on a maximum matching difference obtained from the one or more objects of interest present in each 2D image frame with the training dataset.

3. The method as claimed in claim 1, wherein the step of detecting, by the change detection technique executed by the one or more hardware processors, the one or more defects observed with one or more objects of interest based on the change observed in each 2D image frame from the plurality 2D image frames comprises:

calculating, a geographical distance of the 2D image frames in a specific view with the identical objects of interest of the 2D image frame representing the same asset in varying time stamps; and identifying, the EXIF data based on closest possible pairing based on the calculated geographical distance.

4. The method as claimed in claim 1, further comprising creating a pyramidal view map for the plurality 2D image frames by mapping each pixel of the plurality 2D image frames with the plurality of input images using a key point matching technique.

5. The method as claimed in claim 4, wherein the key point matching technique comprises:

extracting, a feature set of the plurality of input images of the asset being inspected and comparing with each member image associated with the 3D point cloud;

creating, a 3D holistic surface by stitching the plurality 2D image frames based on (i) the overlapped images identified from the plurality of input images, and (ii) a pseudo motion observed in the asset being inspected;

performing, a zero-degree rotation on z-axis of the 3D holistic surface which flattens the plurality 2D image frames representing the 3D holistic surface;

performing, an automated scale-based visualization on different regions of the 3D holistic surface;

fetching, the closest member image associated with the 3D point cloud based on maximum features matching with the plurality 2D image frames;

performing, rotation and affine scaling to fit the degree of convergence for the maximum matched features by calculating a homography matrix; and creating, a blank image for each member image associated with the 3D point cloud which fits gaussian pdf on the region of matching features to merge the blank image for creating pixel level mapping.

6. A system (100), for inspecting asset using an unmanned aerial vehicle comprising:

a memory (102) storing instructions;

one or more communication interfaces (106); and one or more hardware processors (104) coupled to the memory (102) via the one or more communication interfaces (106), wherein the one or more hardware processors (104) are configured by the instructions to:

deploy, an unmanned aerial vehicle to inspect one or more assets associated with an asset monitoring environment, wherein the unmanned aerial vehicle is configured to flew on a predetermined height above the one or more assets being inspected within the asset monitoring environment;

receive, a plurality of input images of an asset from the one or more assets using an image capturing device positioned with the unmanned aerial vehicle, wherein the plurality of input images provides structural health of the asset from the one or more assets being inspected;

generate, by a 3D point cloud generator, a 3D point cloud based on the overlapped images identified from the plurality of input images of the asset being inspected;

convert, the 3D point cloud into a plurality of 2D image frames based on the angle of projection from the top view of the asset being inspected;

generate, a bird's eye view of the asset based on the plurality 2D image frames, wherein the empty patches of each 2D image frame from the plurality 2D image frames are filled based on range-domain filtering;

detect, one or more objects of interests from the plurality 2D image frames using a mask convolutional network (RCNN);

detect, by an anomaly detection technique, anomalies present in the one or more objects of interests associated with the plurality 2D image frames, wherein the anomalies are detected based on a training data serving as ground truth associated with the trained convolutional autoencoder, wherein the training data are samples of the one or more objects of interest for determining deviation observed; and detect, by a change detection technique, defects observed with the one or more objects of interests based on the change observed in each 2D image frame from the plurality 2D image frames in a specific view with an identical objects of interest of the 2D image frame representing the same asset based on varying time stamps and a EXIF data based closest possible pairing.

7. The system (100) as claimed in claim 6, wherein the one or more anomalies observed in the objects of interest associated with the plurality 2D image frames are detected by:

extracting, by a trained convolutional autoencoder, a plurality of features of the one or more objects of interest present in each 2D image frame to detect anomalies;

matching, based on a preconfigured threshold, the plurality of features of the one or more objects of interest present in each 2D image frame with the training dataset; and detecting, the anomalies present in the one or more objects of interest observed in each 2D image frame based on the maximum matching difference obtained with the one or more objects of interest present in each 2D image frame with the training dataset.

8. The system (100) as claimed in claim 6, wherein the change detection technique for detecting defects observed with one or more objects of interest based on the change observed in each 2D image frame from the plurality 2D image frames comprises:

calculating, geographical distance of the 2D image frames in a specific view with the identical objects of interest of the 2D image frame representing the same asset in varying time stamps; and identifying, EXIF data based on closest possible pairing based on the calculated geographical distance.

9. The system (100) as claimed in claim 6, wherein the method further comprises to create a pyramidal view map for the plurality 2D image frames by mapping each pixel of the plurality 2D image frames with the plurality of input images using a key point matching technique.

10. The system (100) as claimed in claim 9, wherein the key point matching technique comprises:

extracting, a feature set of the plurality of input images of the asset being inspected and comparing with each member image associated with the 3D point cloud;

creating, a 3D holistic surface by stitching the plurality 2D image frames based on (i) the overlapped images identified from the plurality of input images, and (ii) a pseudo motion observed in the asset being inspected;

performing, a zero degree rotation on the z-axis of the 3D holistic surface which flattens the plurality 2D image frames representing the 3D holistic surface;

performing, automated scale based visualization on different regions of the 3D holistic surface;

fetching, the closest member image associated with the 3D point cloud based on maximum features matching with the plurality 2D image frames;

performing, rotation and affine scaling to fit the degree of convergence for the maximum matched features by calculating a homography matrix; and creating, a blank image for each member image associated with the 3D point cloud which fits gaussian pdf on the region of matching features to merge the black image for creating pixel level mapping.

11. One or more non-transitory machine-readable information storage mediums comprising one or more instructions which when executed by one or more hardware processors perform actions comprising:

deploying, an unmanned aerial vehicle to inspect one or more assets associated with an asset monitoring environment, wherein the unmanned aerial vehicle is configured to fly at a predetermined height above the one or more assets being inspected within the asset monitoring environment;

receiving, a plurality of input images of an asset from the one or more assets using an image capturing device positioned with the unmanned aerial vehicle, wherein the plurality of input images provides structural health of the asset from the one or more assets being inspected;

generating, by a three-dimensional (3D) point cloud generator, a 3D point cloud based on one or more overlapped images identified from the plurality of input images of the asset being inspected;

converting, the 3D point cloud into a plurality of 2D image frames based on an angle of projection from a top view of the asset being inspected;

generating, a birds eye view of the asset based on the plurality 2D image frames, wherein one or more empty patches of each 2D image frame from the plurality 2D image frames are filled based on range-domain filtering;

detecting, one or more objects of interests from the plurality 2D image frames using a mask convolutional network (RCNN);

detecting, by an anomaly detection technique, one or more anomalies present in the one or more objects of interests associated with the plurality 2D image frames, wherein the one or more anomalies are detected based on a training data serving as ground truth associated with a trained convolutional autoencoder, and wherein the training data comprises one or more samples of the one or more objects of interest for determining deviation observed; and detecting, by a change detection technique one or more defects observed in the one or more objects of interests based on the change observed in each 2D image frame from the plurality 2D image frames in a specific view with an identical objects of interest of the 2D image frame representing the asset based on varying time stamps and an EXIF data based closest possible pairing.

12. The one or more non-transitory machine-readable information storage mediums of claim 11, wherein detecting the one or more anomalies observed in the objects of interest associated with the plurality 2D image frames comprises:
   extracting, by the trained convolutional autoencoder, a plurality of features of the one or more objects of interest present in each 2D image frame to detect anomalies;
   matching, based on a preconfigured threshold, the plurality of features of the one or more objects of interest present in each 2D image frame with the training dataset comprised in a memory; and
   detecting, the one or more anomalies present in the one or more objects of interest observed in each 2D image frame based on a maximum matching difference obtained from the one or more objects of interest present in each 2D image frame with the training dataset.

13. The one or more non-transitory machine-readable information storage mediums of claim 11, wherein the step of detecting, by the change detection technique executed by the one or more hardware processors, the one or more defects observed with one or more objects of interest based on the change observed in each 2D image frame from the plurality 2D image frames comprises:
   calculating, a geographical distance of the 2D image frames in a specific view with the identical objects of interest of the 2D image frame representing the same asset in varying time stamps; and
   identifying, the EXIF data based on closest possible pairing based on the calculated geographical distance.

14. The one or more non-transitory machine-readable information storage mediums of claim 11, further comprising creating a pyramidal view map for the plurality 2D image frames by mapping each pixel of the plurality 2D image frames with the plurality of input images using a key point matching technique.

15. The one or more non-transitory machine-readable information storage mediums of claim 14, wherein the key point matching technique comprises:
   extracting, a feature set of the plurality of input images of the asset being inspected and comparing with each member image associated with the 3D point cloud;
   creating, a 3D holistic surface by stitching the plurality 2D image frames based on (i) the overlapped images identified from the plurality of input images, and (ii) a pseudo motion observed in the asset being inspected;
   performing, a zero-degree rotation on z-axis of the 3D holistic surface which flattens the plurality 2D image frames representing the 3D holistic surface;
   performing, an automated scale-based visualization on different regions of the 3D holistic surface;
   fetching, the closest member image associated with the 3D point cloud based on maximum features matching with the plurality 2D image frames;
   performing, rotation and affine scaling to fit the degree of convergence for the maximum matched features by calculating a homography matrix; and
   creating, a blank image for each member image associated with the 3D point cloud which fits gaussian pdf on the region of matching features to merge the blank image for creating pixel level mapping.

* * * * *